Aug. 3, 1954

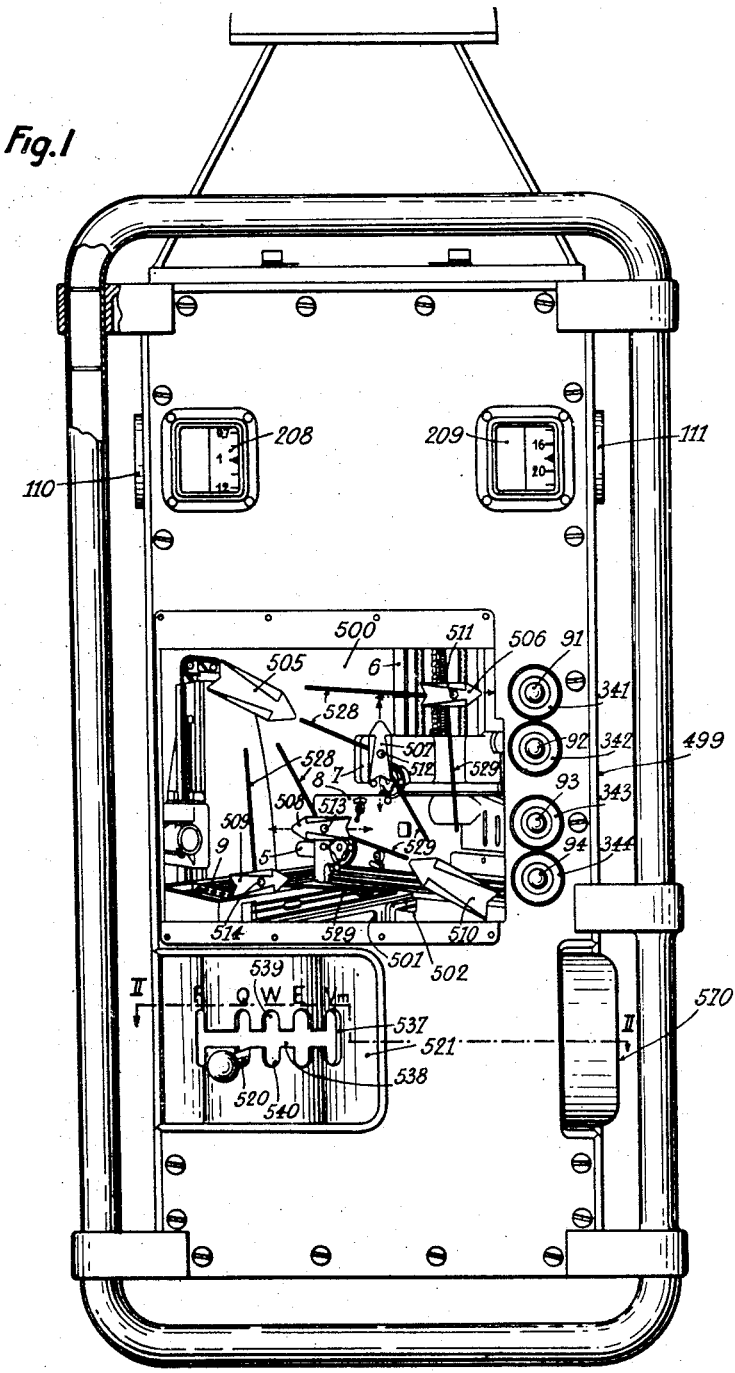

C. W. BERTHIEZ
DEVICE FOR CONTROLLING ELECTRIC
MOTOR OPERATED MACHINE MEMBERS 2,685,666

Filed Jan. 25, 1951

INVENTOR
Charles William Berthiez
By George H. Corey

ATTORNEY

Aug. 3, 1954

C. W. BERTHIEZ
DEVICE FOR CONTROLLING ELECTRIC
MOTOR OPERATED MACHINE MEMBERS 2,685,666

Filed Jan. 25, 1951

INVENTOR
Charles William Berthiez
By George Hearly

ATTORNEY

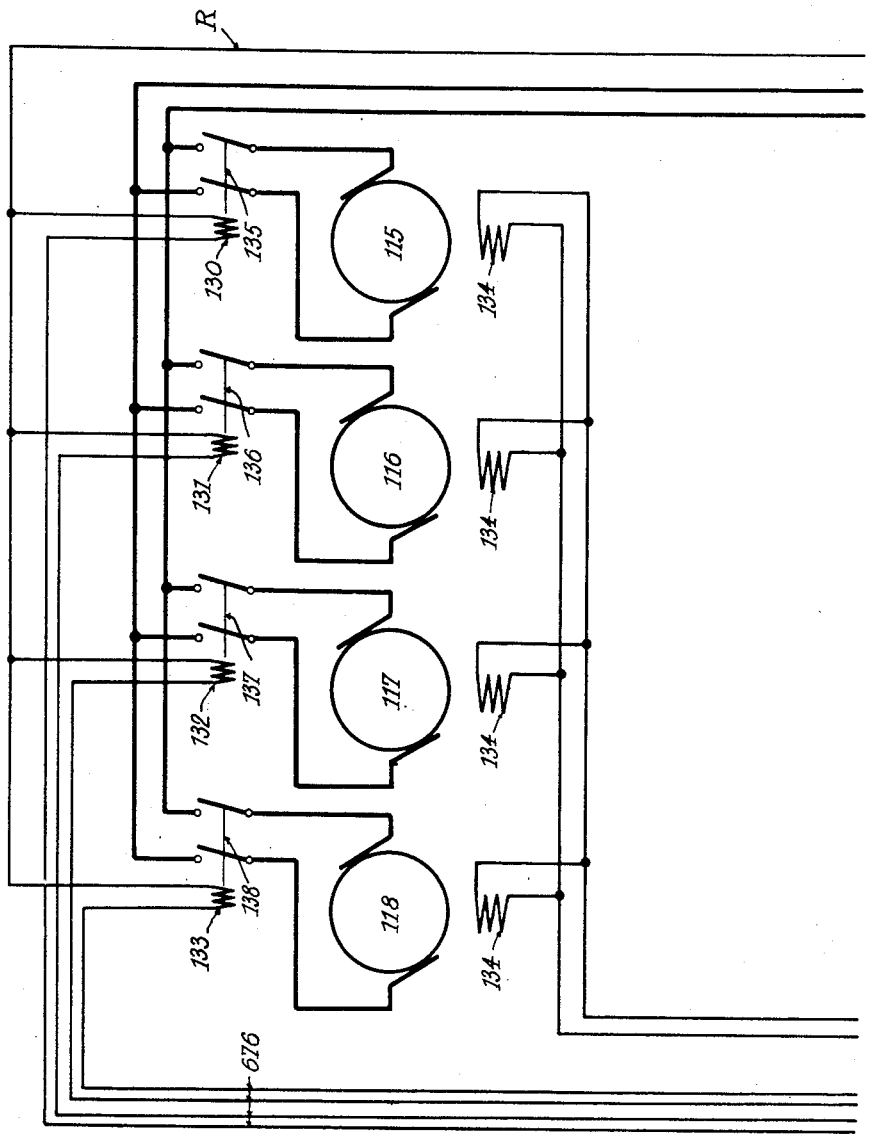

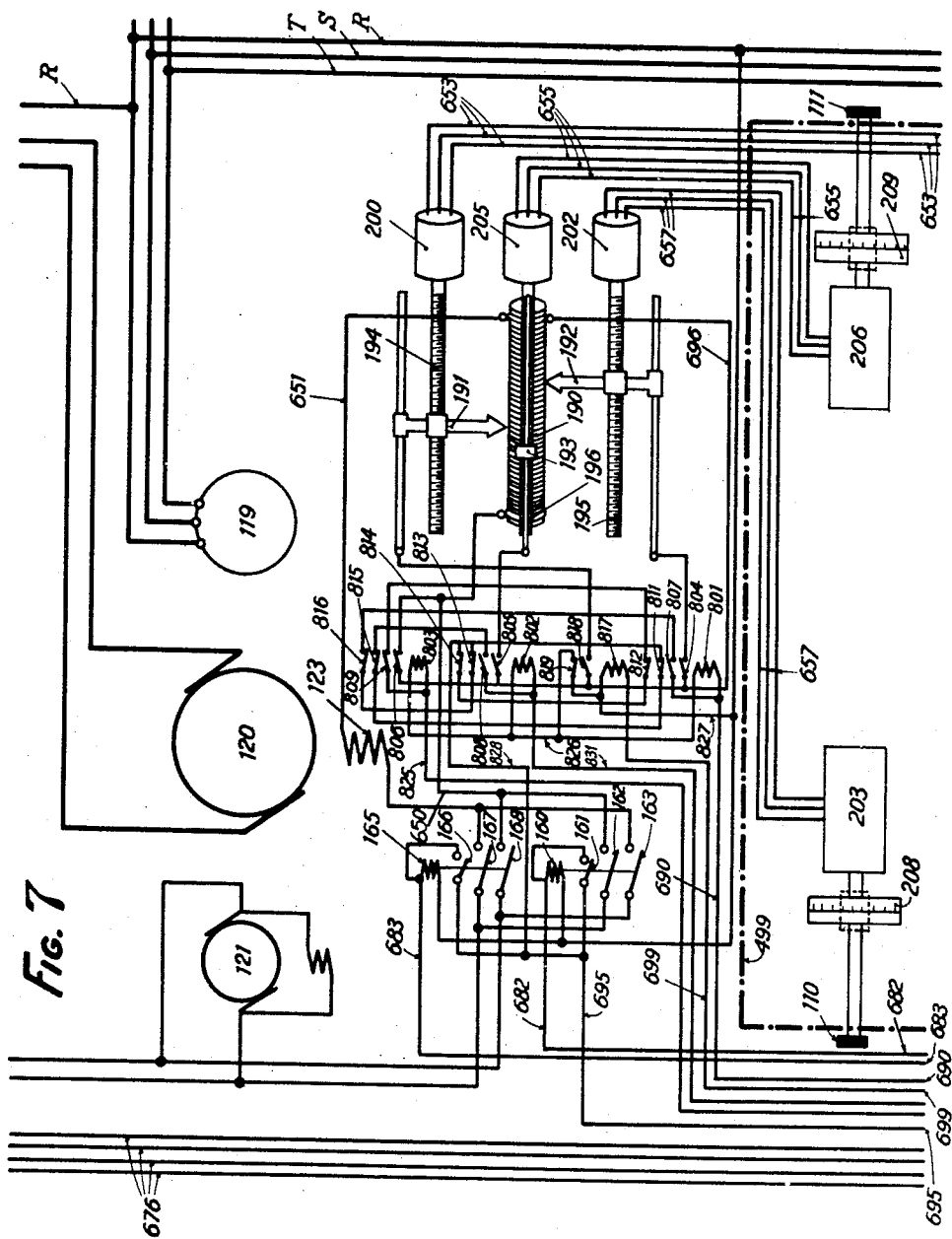

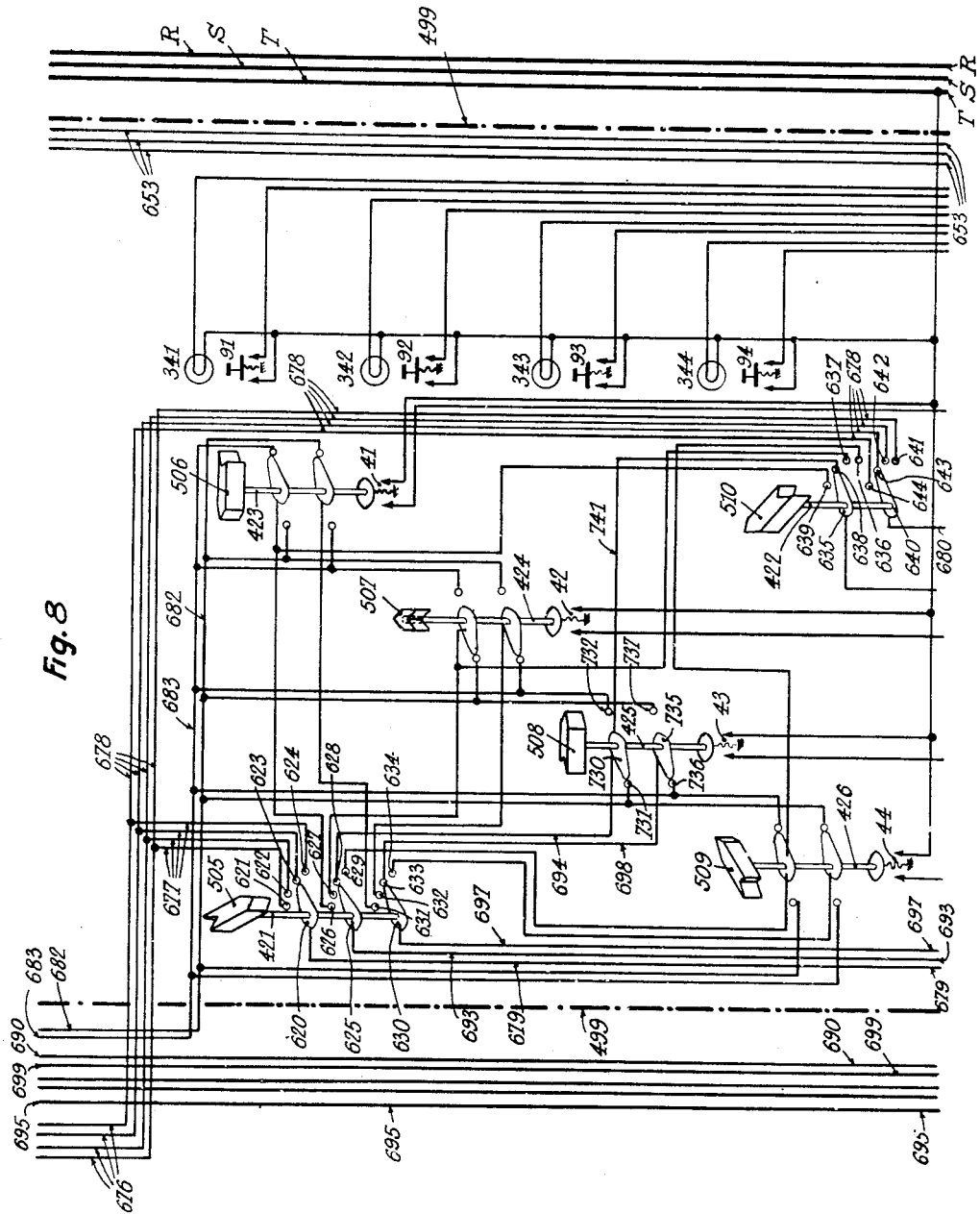

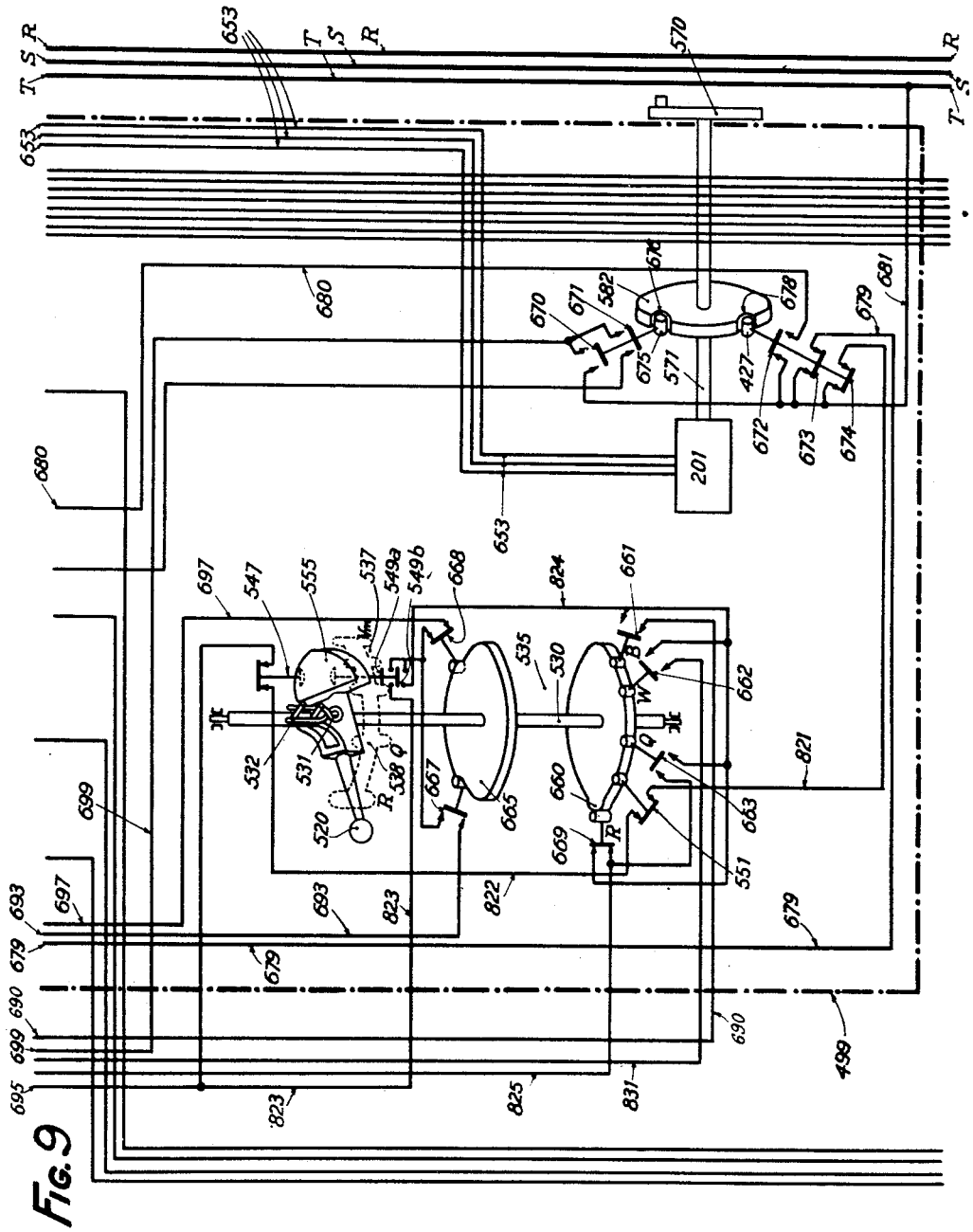

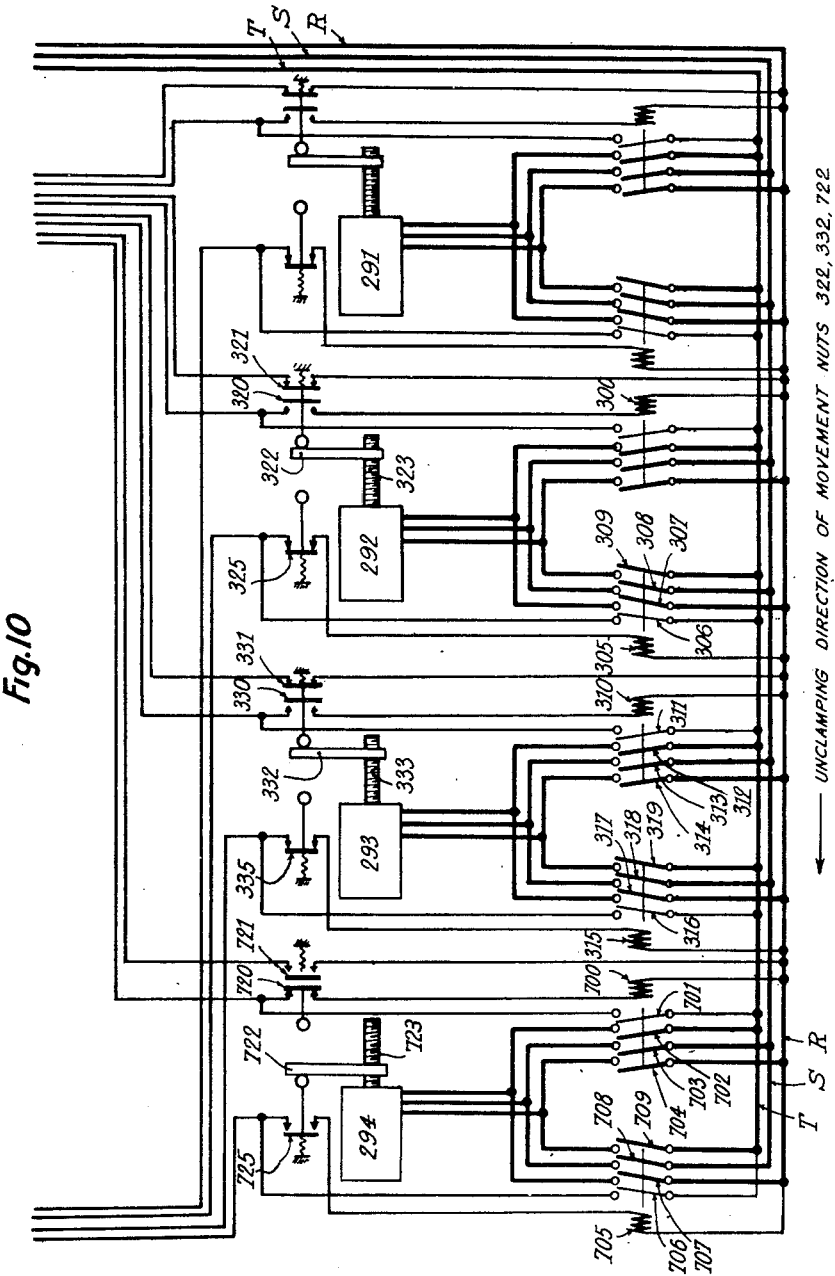

Patented Aug. 3, 1954

2,685,666

UNITED STATES PATENT OFFICE 2,685,666

DEVICE FOR CONTROLLING ELECTRIC MOTOR OPERATED MACHINE MEMBERS

Charles William Berthiez, Paris, France

Application January 25, 1951, Serial No. 207,747

Claims priority, application France October 25, 1946

16 Claims. (Cl. 318—158)

This invention relates to apparatus for controlling the operation of machine tools, hoisting apparatus and the like. The invention more particularly relates to control panels or control boxes or the like associated with apparatus and devices for effecting control of the movable members of such machines, especially when such movable members are driven by electric motors.

It has been proposed heretofore to control movement of a movable member of a machine by so-called remote control from a given station. For this purpose electric control circuits have been utilized provided with relays controlled by contacts actuated by push buttons or other devices located at the station for energizing or de-energizing the relays, these relays being effective to initiate and to control the energization and speed of a suitable motor connected to the member to be moved for effecting the desired movement thereof. More recently it has been proposed in connection with the operation of machine tools to mount the control push buttons on a control box or control panel suitably supported for movement about the machine to be operated so that the operator of the machine may carry out the controls from a position more conveniently located with respect to the member of the machine to be moved and the function which it performs than is possible when a control box or panel is located in fixed relation to the machine at a given station. Such portable control boxes or panels of the prior art may have the advantage of convenience in carrying out the control operation and of making possible closer inspection of the operation to insure greater accuracy of the machine operation and less physical fatigue of the operator in not being required to move frequently about the machine, especially in the operation of large machine-tools or the like, and other advantages. Nevertheless, with the control devices heretofore proposed, by virtue of the fact that the large number of push buttons and other elements required to be actuated by the operator have been assembled in close relation in order to limit the size of the control panel or box, careful attention to the control panel is required, whether it be on a portable box or one stationary at a given station, in order that the operator may know what buttons or other elements are to be or have been actuated and therefore what members of the machine are to be controlled or are conditioned for control and for movement thereof. Such careful attention to the panel or box and the control elements carried thereby to distinguish with certainty one element from the other detracts from the attention required to be given to the machine itself, the member thereof to be moved, the tool carried by such a movable member and the work piece upon which it is desired that such tool shall operate. Moreover, in the devices of the prior art where a substantial number of members of the machine are required to be moved each in a plurality of directions, as in a machine tool, the number of the control elements required to be operated has been so large that the number of selections to be made complicates seriously the operations necessary to carry out the control and increases greatly the attention required of the operator for this purpose.

It is an object of the invention to provide the control box with means for operation of the machine members in accordance with predetermined settings of the control apparatus including the settings of speed control devices, preferably rheostats for controlling the speed of the motors driving the respective movable members. In such an operation provision is made for moving the respective members at a plurality of different speeds by means of a single handle movable to a plurality of selecting positions successively.

It is an important feature of the invention to use said handle to select the desired speed by moving said handle to a predetermined selecting position and also to control the starting and the stopping of movable machine members when said handle is set at said predetermined selecting position.

In one embodiment of the invention, the passage of said handle from one selecting position to any other selecting position is effected without controlling any speed corresponding to an intermediate selecting position.

Other objects and features of the invention will appear from the following description taken in connection with the drawings which show one embodiment of a control system including a control box. Moreover, certain structural features of the control boxes which constitute improvements upon the prior art devices will be understood from the description to be given in connection with these drawings in which:

Figure 1 is a front view of a movable control box according to one embodiment of the invention;

Figures 6 to 10 taken together show a wiring diagram of the machine-control device including the speed selecting means of Figure 4.

Figure 3:
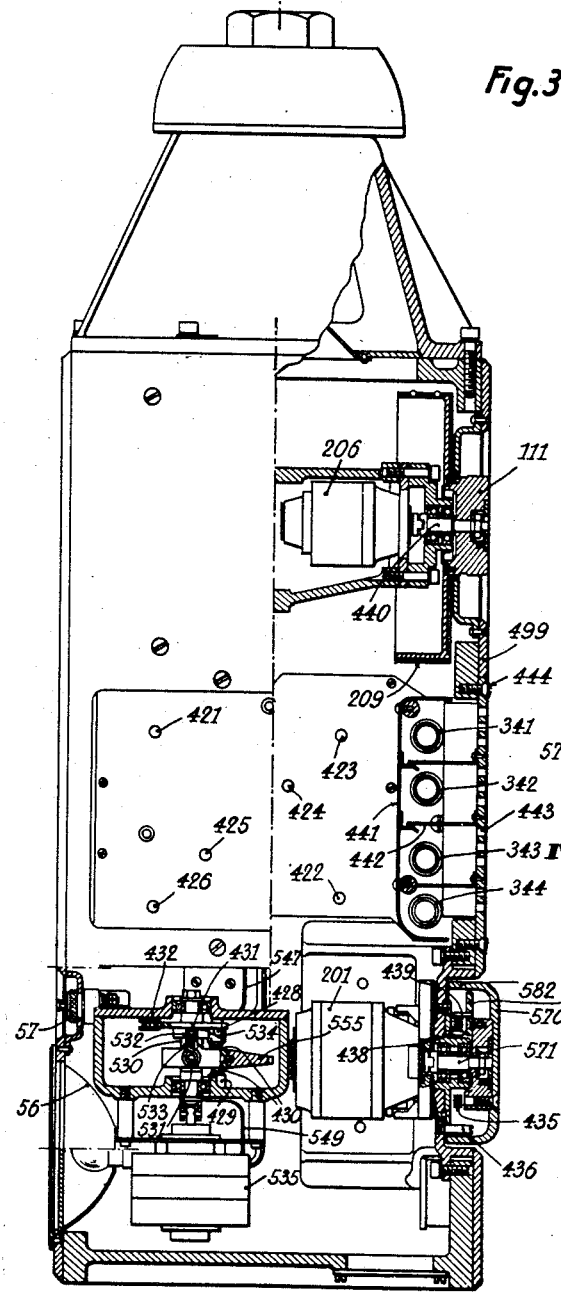
Figure 3 is a section on line III—III of Figure 2.
Figure 2:
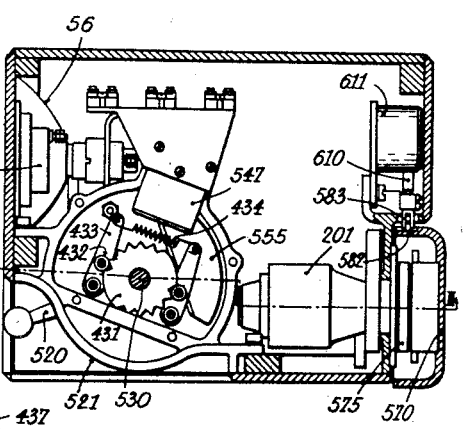
Figure 2 is a horizontal section on line II—II of Figure 1.

I will now describe one embodiment of my invention as illustrated in the drawings. The device shown in these drawings is constituted by an improved pendant control box which can be used in connection with a machine tool such as a boring and milling machine as depicted on the front face thereof as shown in Figure 1. However, the improved control box of this embodiment may be used in connection with other types of machines.

The pendant control shown in elevation in Figure 1 comprises a box 499, preferably a light metal alloy casting.

On the front of the box a panel or plate 500 is supported on which is engraved a pictorial representation of the boring and milling machine and carrying two member selector elements 505 and 510 respectively for "automatic" operation and for manual or "trigger" operation for selecting the member of the machine to be moved and four direction selector elements 506, 507, 508, 509. These direction selectors respectively are associated with the depicted movable members, that is with the column 6 of the boring and milling machine, the carriage 7 vertically movable thereon, the headstock 8 horizontally movable on the carriage 7 and the table 9 horizontally movable transversely of the headstock and column movements. These direction selectors respectively carry unclamping buttons 511, 512, 513, 514 for controlling unclamping of the movable members of the machine depicted on the panel with which respectively the direction indicators are associated. Four clamping buttons 91, 92, 93, 94 are provided for clamping the movable members, these buttons being positioned at the same level as the respective direction selectors and being provided with translucent rings which are illuminated by lamps 341, 342, 343, 344 when the corresponding movable members with the depiction of which the direction selector is associated is clamped.

In the middle of Figure 3, the reference numbers 421 and 422 apply to the shafts of movement selectors 505 and 510 respectively, whereas numerals 423, 424, 425 and 426 designate the shafts of the direction selectors 506, 507, 508, 509 respectively as stated with reference to Figure 1. Besides these selectors, on the right hand side may be seen the signal lamps 341, 342, 343, 344 also already mentioned with reference to Figure 1.

Control lever 520 as shown in Figures 1 to 5 projects through an arcuate portion of the wall 521 of the box for selecting the speed of the movable member of the machine selected by means of the "automatic" operation selector element 505. This arcuate wall provides a grid having vertical notches intersecting a horizontal slot for starting and stopping the movement of said member and for determining the speeds thereof and for determining the "quick return" movement as hereafter described. Two speed indicators 208 and 209 for indicating the "engagement" and "working" speed respectively are carried on this portable control box.

In the wall of the box 499 on the right hand side thereof as viewed in Figure 1 is arranged near the bottom the manually operable element 570 of a control device for progressively adjusting the speed of the movable member selected by means of the "trigger" operation selector element 510 and for starting and stopping the movement of such a member.

At the level of the indicator 209 at this right hand side a knob 111 for controlling the "working" speed is carried on the shaft extension of the drum of indicator 209 and the transmitter 206 (see also Figures 3 and 7). At the left hand side of the box 499 is arranged at the level of the indicator 208 a knob 110 carried on the shaft extension of the drum indicator 208 and transmitter 203 for controlling the "engagement" speed (see also Figure 7).

Adjacent the bottom on this left side face a lighting device 56 and its switch 57 (Figure 3) are arranged which allows the operator to light up the area where the tool is working.

I will now describe in detail the different elements carried by the box 499 which are particularly associated or cooperate with the control lever 520.

The panel 500 shows as a pictorial representation the principal members of a boring and milling machine. These members are respectively the bed 501 on which a table 9 may slide either forward or backward, the frame or support 502 along which the upright or column 6 may move towards the right or the left, the saddle or carriage 7 adapted to slide up and down the upright 6, the headstock 8 adapted to move horizontally along the saddle 7 toward the right or the left and lastly the tool-carrying spindle 5 mounted in the headstock 8. The workpiece to be machined is secured to the table 9.

On the part of the pictorial representation illustrating the table 9 is located the direction selector or switch 509, the arrow shaped handle of which may assume two positions, namely the position illustrated in the drawing when it points to the backward direction and the diametrically opposed position pointing to the forward direction.

Similarly, on the part of the pictorial representation illustrating the headstock 8 is located the direction selector or switch 508 constructed as described for selector 509 so that the arrow-shaped handle thereof may also assume two positions, that illustrated in the drawing where it points to the left and the opposite direction.

Two other similar direction selector switches 507 and 506 are similarly adapted to be "positioned" to indicate respectively the movements of the saddle or carriage 7 and of the upright 6.

These four direction switches 509, 508, 507 and 506 thus are supported on spindles having their axes perpendicular to the face of panel 500 and respectively are operable for selecting the directions of the movement of the movable members of the machine, that is the table, the headstock on the saddle, the saddle on the upright and the upright on its support, upon which as they are depicted on the panel these direction selectors respectively are located. Moreover, the locations of these direction selectors on the panel are angularly spaced with respect to each other about the locations on the panel of both the member selector 505 and the member selector 510.

The selector element or switch 505 also is provided with an arrow shaped handle and is pivotally supported on a spindle having its axis perpendicular to the face of the panel 500 for rotation to four different positions for selecting one of the four members to be moved which have been mentioned hereinabove. To select a member to be moved the tip of the arrow-shaped handle of said switch 505 is pointed towards the direction switch 509, 506, 508, 507 located on the diagrammatical representation of the movable members, that is, the table, the upright, the headstock and the carriage. On the pictorial representation converging lines 528 are drawn showing more clearly the four positions that may be assumed by the switch handle 505.

The movable member selector or switch 510 also is supported for pivotal movement on a spindle having its axis perpendicular to the face of panel 500 to four different positions with the arrowshaped handle thereof pointing to the location of the particular direction selector 506, 507, 508, 509 associated with the depicted movable member to be moved. The part played by said switch and its structure is similar to that of the switch 505, so that this switch 510 may be selectively "positioned" in the four different positions pointing along the convergent lines 529 which serve the same purpose as lines 528 of the switch 505.

The position of each of the direction controlling switches 509, 508, 507, 506 is completely independent of the position of any of the three others and is also completely independent of the position given to the two movement selecting switches 505 and 510 which, in their turn, are completely independent of one another. Any of these selectors may be operated, therefore, or its position changed regardless of the position occupied by the others to accomplish the desired direction of movement of the desired member to be moved, whether by "automatic" or "manual" operation.

In connection with Figure 1, I have described the switches 506, 507, 508 and 509 as respectively constructed with push buttons 511, 512, 513 and 514 thereon for control of the unclamping of the member selected to be moved. In connection with the wiring diagram of Figures 6 to 10 inclusive a modified form of these direction selectors 506, 507, 508, 509 will be described in which the arrow handle thereof itself may be pushed in the direction along the pivotal axis for effecting unclamping.

With the above described selecting device it is possible to pass very easily from "automatic" operation to "manual" operation and from the movement of one member in a predetermined direction to the movement of another member in any desired direction.

The selection may be executed as a preliminary operation i. e. the choice of the member to be controlled and the choice of the direction in which it is to be moved may be carried out before starting the machine or else, on the other hand, such selection may be carried out while the machine is already running.

I will now describe with reference to Figures 4 and 5 the control lever 520 hereinabove referred to.

Figure 4:
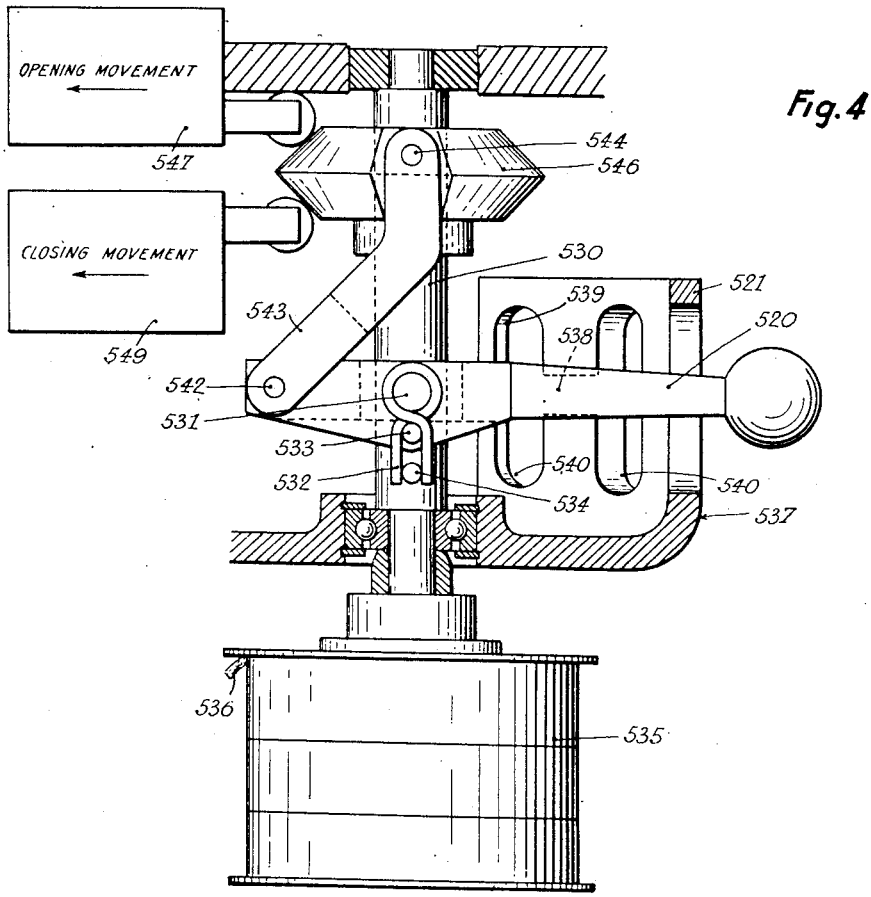
Figure 4 is a sectional view of a speed-selecting means operated by a control lever.
Figure 5:
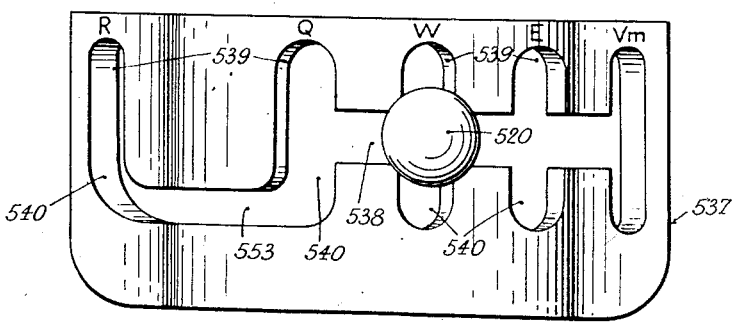
Figure 5 shows a modification of the grid used in the speed selecting means shown in Figure 4.

As apparent from Figures 4 and 5 a lever 520 is pivotally secured to a vertical shaft 530 and is adapted to be moved in a vertical plane with a slight angular upward or downward movement around the axis of the pivot 531. When the lever 520 is released at any point it always returns to a horizontal position due to the action of a spring 532 which is wound about the pivot 531 and the ends of which engage two studs 533 and 534, stud 533 being integral with the lever 520 and stud 534 being integral with the shaft 530.

The shaft 530 to which the lever 520 is secured is operatively connected with a rotary combination switch 535 of any known type itself electrically connected through conductors arranged in a sheath 536 to the apparatus controlling the speed of operation of the movable member being controlled (see below the description of the wiring diagram shown in Figures 6 to 10). The lever 520 may be moved in a grid 537 comprising a horizontal slot 538 in wall 521 as shown in Figures 1 and 4 provided at its upper edge with notches 539 and at its lower edge with notches 540 located immediately below the upper notches 539. Referring in particular to Figure 1 it will be observed that the upper notch at the extreme right is marked V$m$ which stands for minimum feed. Reading from right to left the other notches are marked E which stands for "engagement" feed, notches W, Q and R representing respectively "working" or cutting feed, "fast" feed and "quick return." Any two notches aligned in the same vertical plane correspond to the same feed speed, the upper notch serving to start the movement and the lower notch to stop the movement.

Lastly, it can be seen by referring in particular to Figure 4 that the inner end of the lever 520 is pivotally secured at 542 to a connecting rod 543 the upper forked end of which is pivotally secured at 544 to a cam 546 biconical in shape and adapted to slide along the shaft 530 and to actuate when moved upwardly by downward movement of lever 520 an electric impulse contact piece 547 or to actuate when moved downwardly by upward movement of lever 520 another electric impulse contact piece 549 having contacts 549$a$, 549$b$, Fig. 9.

When the lever 520 is moved horizontally along slot 538 it rotates the shaft 530 on its vertical axis which actuates the combination switch 535 and when this lever is moved vertically downward and upward into any one of the notches of the grid 537 it actuates respectively the two contacts 547 and 549 (see also Figure 9).

The combination switch 535 is preferably equipped with a contact piece 551, Figure 9, for stopping the movement put into play when the lever 520 is rotated between the notches marked Q (fast feed) and R (quick return).

As several speeds must not be imparted simultaneously to the member of the machine selected to be moved the control circuit as shown in the wiring diagram of Figures 6 to 10 is designed in such a manner in connection with the combination switch 535 operated by lever 520 that the control of one speed is cut off upon connecting the controlling apparatus to produce a new speed. This will be fully understood from the explanations given hereinafter in connection with the operation of the device.

In cooperation with the mechanism described in connection with Figure 4 any known positioning device may be used which may be part of the combination switch 535, this device constraining the lever 520 to maintain at all times a position to which it has been moved opposite some one of the notches. In the embodiment shown on Figure 4, this positioning device is incorporated within the combination switch 535, whereas in the embodiment shown on Figures 2 and 3, it is located in the upper part of the assembly and comprises a star like part 431 rigid with shaft 530 and adapted to cooperate with rollers 432 carried by arms 433 pivotally mounted upon the combinator frame and urged towards each other by a spring 434.

The operation of the system that has just been described is as follows:

It will be assumed that the machine to be controlled is a machine tool such as the boring and milling machine already referred to. If it is now desired to make the table 9 of this machine travel at the speed of "fast" feed over a certain length of travel, the lever 520 has merely to be brought in position in front of the notch Q, "fast" feed, raised and then released. By this single operation the "fast" feed speed has been selected through the switch 535, the impulse contact piece 549 has been actuated closing the control circuits of the apparatus; thus the desired speed of "fast" feed has been imparted to the movable member of the machine. The operation will be more completely described hereinafter with reference to Figures 6 to 10.

In order to select now the "working" speed, a similar operation is all that is required, that is, the lever 520 is moved along slot 538 and is positioned in front of the notch W corresponding to "working feed," thereby changing the contacts engaged within the combination switch 535. The movable member of the machine is then automatically operated at "working" speed.

Once a given feed movement has been imparted to the selected movable member of the machine, it can be stopped at any moment by shifting the lever 520 into the lower notch 540 below the position of the lever corresponding to the selected feed. This operation raises the cam 546 which actuates the contact 547 whose function is to stop the movement. Thus, for example, if the machine is in operation and its table or other movable member is moving at a previously imparted "working" feed, the lever 520 needs merely be shifted into the lower notch 540 corresponding to letter W and the member thereby will be stopped.

In order now to impart a "quick return" stroke to the movable member, the lever 520 is moved to the notch R. During this manipulation the stopping contact 551, Figure 9, forming part of the switch 535 is actuated, to effect the "automatic" stopping of the movable member which has been moving in the working direction at a given speed. This permits the member to start up again in the opposite direction so as to execute the return stroke as soon as the lever 520 is raised into notch 539 marked R. This return movement may be interrupted at any given moment by lowering the lever 520 into the notch 540 marked R.

In Figure 5 I have shown a modification of the grid of Figures 1 and 4 adapted to achieve the same result without having to provide a special stopping contact piece 551 in the switch 535 between the positions of the shaft 530 of this switch that are comprised between the positions corresponding to the notches Q and R.

In this variation the horizontal slot 538 stops at the intersection with the upper and lower notches Q. Another horizontal slot 553 is provided connecting the notches Q and R but this slot 553, parallel with slot 538, is shifted downwardly with respect to the slot 538 so as to come level with the bottoms of notches 540 marked Q and R. Therefore, when passing from Q to R the operator is first obliged to lower the lever 520 into the lower notch 540 marked Q and thereby cause the movable member to stop. Then, continuing along the slot 553 until the notch 540 marked R is reached the lever may be raised to the level of slot 538 and continued upward into the notch 539 marked R to initiate the "quick return" stroke.

In certain cases all the lower notches 540 may be interconnected so as to form one large indentation.

In the example described hereinabove, it was assumed that control was to be exercised over various feed speeds for the same movable member of a machine but the same system is applicable in the case where it is desired to control in succession the movements of several different movable members of a machine or apparatus, each member being moreover capable of assuming various feed speeds as desired and also of moving in both directions.

In the wiring diagram shown in Figures 6 to 10 which will be more completely described hereafter, I have shown a modification of the control device shown in Figure 4, this modification being different from the embodiment of Figure 4 in that the biconical cam 546 is replaced by a sector 555 rigid with the lever 520, this sector actuating either the contact 547 or the two pole contacts 549a, 549b, according to whether the lever 520 is depressed or raised.

As concerns the contact switches 547 and 549a, 549b, each of them is provided with an actuating stem 428, Fig. 3, adapted to reciprocate in a sleeve 429 that houses a ball 430 engaging the end of this stem. The sector 555 is secured to the inner end of lever 520 (see also Figure 2) and adapted to engage one or the other of said balls while the lever is raised or lowered, thus actuating either of contacts 547 or 549a, 549b.

Having described the main elements of the pendant control box shown in Figures 1 to 5 inclusive, I will now describe the operation of the control box 499 with reference to the wiring diagram of Figures 6 to 10 inclusive which shows the electrical circuits connecting the several elements together and with the feed motors 115, 116, 117, 118 and with the clamping motors 291, 292, 293, 294 of the movable members of a machine tool such as a boring and milling machine.

In Figure 6 the four feed motors are energized through a Leonard group which is controlled by the rheostat 199, Figure 7.

The motors providing for shifting the upright 6, carriage 7, headstock 8 and table of the machine which are indicated by the reference numbers 115, 116, 117 and 118 respectively have their armature windings connected in parallel to the armature of the generator 120 through the double pole contacts 135, 136, 137, 138 respectively of contactors 130, 131, 132, 133.

The rotational direction of these motors 115, 116, 117, 118 is controlled by direction selecting switches 506, 507, 508, 509 respectively, as described in connection with Figure 1, through circuits described hereafter. These switches are provided with shafts 423, 424, 425 and 426 carrying contact arms such as 730 and 735 (for switch 508). The selection of the feed motors 115, 116, 117, 118 to be energized is accomplished by means of member selecting switches 505 for the "automatic" feed movement and 510 for the "manually" controlled feed movement secured by means of the control disk 570. The switch or selector 505 is provided with a shaft 421 carrying three contact arms 620, 625, 630 cooperating with three sets of studs 621, 622, 623, 624 for the arms 620, 626, 627, 628, 629 for the arms 625, 631, 632, 633, 634 for the arm 630. The four studs of each set are positioned so as to be engaged by the respective arms when the member selector 505 is respectively set to select the member to be moved. The switch or selector 510 is provided with a shaft 422 carrying two contact arms 635 and 640 cooperating with two sets of studs 636, 637, 638, 639 for the arm 635 and 641, 642, 643, 644 for the arm 640.

The sped of the motors 115, 116, 117, 118 is adjusted by means of the rheostat 190 having three sliders 191, 193 and 192. The slider 191 is adapted for controlling the feed speeds through the manual control disk 570, slider 193 for adjusting the so-called "working" feed speed and slider 192 for the so-called "engagement" speed feed.

The rheostat 190 is arranged in the energizing circuit of the field winding 123 of the generator 120 from the exciter armature 121 through a circuit comprising for the rotational direction called "forward direction" field winding 123, contact 163 of forward direction relay 160, armature winding of exciter 121, contact 162 of relay 160, wire 650, rheostat 190 and wire 651 again to field winding 123. For the reverse rotational direction the circuit comprises field winding 123, contact 167 of reverse relay 165, armature winding of exciter 121, contact 168 of relay 165, wire 650, rheostat 190, wire 651 again to the field winding 123.

In this second circuit the excitation current of the generator 120 is caused to flow in the reverse direction with respect to the first circuit. The generator armature current is thus reversed and the motors 115, 116, 117, 118 energized from this generator will then rotate in the opposite direction.

The forward and reverse relays 160 and 165 respectively have holding contacts 161 and 166. The energizing circuits of these two relays will be explained hereinafter.

When the entire resistance of rheostat 190 is inserted into the generator field winding circuit this generator which is caused to rotate at a constant speed thereby delivers its minimum voltage so that the motors 115, 116, 117, 118 will rotate at their lowest speed.

As may be seen in Figure 7, the speed-selecting relays 801, 802 and 803 are provided with main contacts 804, 805 and 806 respectively to control the engagement, working and fast speeds respectively. They are also provided with holding contacts 807, 808 and 809 and with interlocking contacts 811—812, 813—814 and 815—816 the function of which will be explained hereinafter.

The "manually controlled" feed-speed relay is indicated at 817. Contact 819 is a contact intended to make relays 801, 802 and 803 inoperative when relay 817 is energized.

To set up the "engagement" speed, slider 192 is put into operation, that is, that portion of the rheostat 190 which is located on the right-hand side of the slider 192 in Figure 7 is short circuited when contact 804 of relay 801 is closed upon energizing relay 801.

The "working" speed is obtained by connecting the slider 193 in the circuit by energizing the relay 802 operating the contact 805 to short circuit that portion of the rheostat which is located on the right-hand side of the slider 193 in Figure 7.

Further, the "fast" speed is obtained by short circuiting the whole rheostat 190 by energizing relay 803 to close its contact 806.

The "manually controlled" feed speed is obtained when the control disk 570 is used through positioning, according to the position of the disk 570, the slider 191 on rheostat 190, this slider being connected in circuit when contact 818 of relay 817 is closed upon energization of relay 817.

The adjustment of the respective positions of the sliders on the rheostat may be remotely controlled through "telerotators" or receiver motors 200, 205, 202, e. g. of the Selsyn synchronously controlled type. Thus the manually controlled slider 191 is actuated by rotating the screw 194 driven by the receiver 200 connected by wires 653 to the transmitter 201 on the shaft 571 on which control disk 570 is fastened. Movement of slider 193 takes place through rotating the screw 196 driven by the receiver 205 connected through wires 655 to the transmitter 206 on the shaft of which is fastened the operating knob 111. On this shaft also is mounted the graduated drum 209 for directly indicating the selected "working" speed as described in connection with Figures 1 to 3. Slider 192 is adjusted by means of the screw 195 rotationally driven by the receiver 202 connected through wires 657 to the transmitter 203 on the shaft of which is fastened the operating knob 110. The graduated drum 208 also is mounted on this shaft and shows directly the corresponding "engagement" speed as described in connection with Figures 1 to 3.

The "automatic" operation at "minimum" speed, "engagement" speed, "working" speed, "fast" speed and "quick return" stroke speed is accomplished by actuating the lever 520 pivotally connected to the vertical shaft 530, Figures 9 and 4. This lever may be moved in the grid 537 shown in dotted lines in Figure 9 in two directions, horizontally in the slot 538 Figures 9 and 5 about the vertical axis of shaft 530 and vertically about the pivotal axis 531 when the lever is so positioned as to register with one of the notches 539 or 540 designated in Figures 9 and 4 by "Vm", "E", "W", "Q" and "R" which correspond to the above mentioned feed speeds respectively.

When the lever 520 is moved to a position to register with any of the notches E, W, Q the speed cam 660, Figure 9, engages respectively the corresponding switches 661, 662, 663.

When the lever 520 is raised within any of the notches, the sector 555 carried by this lever at the opposite end from the end thereof which projects through the wall 521 of the box 499 is lowered so that the two pole switch 549 at its contacts 549a, 549b is closed, Figures 9 and 4. Conversely, when the lever 520 is lowered in a notch 540, the switch 547 is opened by the sector as it moves upwardly. The spring 532 is provided, as in Figure 4 for ensuring the automatic return of the lever 520 to its horizontal position in which switch 549 is opened and switch 547 is closed.

The horizontal rotary movement of the lever 520 will also cause the cam member 665 to rotate, this cam being so formed with respect to two switches 667 and 668 that when one of these switches is closed by the cam 665 the other is open. The cam 665 is arranged on shaft 530 in such relation to cam 660 and the locations of the contacts actuated by these cams is such that the switch 669 for "quick return" actuated by cam 660 is closed at the same time as switch 668 is closed by cam 665.

The switch 551 is arranged between the "fast" speed switch 663 and the "quick return" stroke switch 669 and is connected in series with the stop switch 547 in the holding circuit of relays 160 and 165 for preventing any sudden change from forward to return speed and vice-versa.

The control member for "manually controlling" the feed motion is the disk 570 which, as indicated hereinabove, is mounted on the shaft 571 of transmitter 201 for adjusting the position of slider 191 on rheostat 190. The shaft 571 also is connected with the cam 582, Fig. 9, adapted to operate switches 670, 671, 672, 673 and 674. This cam 582 is shown in the position corresponding to the neutral position of the disk 570 in which the front contacts 670, 671 and 672 are opened while the back contacts 673 and 674 are closed. The contacts 670, 671 are carried by cam follower 675 engaged on notch 676. Contacts 672, 673, 674 are carried by cam follower 427 engaged on notch 678. Immediately after the disk has been moved from its neutral position so that cam followers 675, 427 are forced outwardly by the cam 582; the front contacts 670, 671, 672 which were open will be closed and back contacts 673, 674, will be opened.

The contactors 120, 131, 132 and 133 for the four feed motors are connected respectively to the contact studs 621, 622, 623, 624 for contact arm 620 of the member selector 505 (automatic operation) by means of wires 676 and 677 and respectively to the contact studs 641, 642, 643, 644 of the contact arm 640 of the member selector 510 (manually controlled operation) through the wires 676 and 678.

One terminal of each of these contactors is directly connected to the phase R of the three-phase supply and the other terminal thereof is connected as stated in the preceding paragraph to the respective contact studs of the contact arms 620, 640 respectively of the two member selectors and thence through a circuit comprising the wire 679 and contact 673 for selector 505 and wire 680 and contact 672 for selector 510 both returning through the wire 681 to phase T of the supply.

The input terminals of the relays 160, 165 controlling the rotation of the motors 115, 116, 117, 118 respectively in the forward or reverse direction are directly connected to the phase R of the supply while their output terminals are connected respectively through wires 682 and 683 to the direction selectors 506, 507, 508, and 509 and through circuits which presently will be described in the description of the operational sequence.

The hereinabove described control box operates as follows:

The electrical circuits involved may be traced on the wiring diagram formed by Figures 6 to 10 taken together.

When the machine is in its inoperative condition, the control disk 570 is in its inoperative position so that the contacts 670, 671 and 672 are open while the contacts 673 and 674 are closed.

The member selectors 505 and 510 as well as the direction selectors 506, 507, 508, 509 may have been left in any position. The "automatic" operation speed selecting lever 520 may have been left positioned so as to register with any of the notches V*m*, E, W, Q or R. Ordinarily all the movable members will have remained clamped except the member involved in the last operation of the machine, for instance, the table 9.

It will be assumed that the operation to be carried out next is to move the headstock 8 toward the right on the carriage 7 through an "automatic" operation feed movement. The member selector 505 is rotated to the position in which the arrow-shaped handle of this selector will be directed toward the diretcion selector 508 located on the pictorial representation of the headstock 8, Figure 1. The direction selector 508 is rotated so as to direct the arrow head formed by its handle to the right which is the desired direction of movement of the headstock 8. This selector handle 508 then is pressed axially to close the headstock unclamping contact 43, thus causing contactor 315 to be energized and hence the closing of its contacts 316, 317, 318 and 319. By closing the contact 316 the holding circuit of contactor 315 is maintained after the selector 508 is released from axial pressure. The closing of contacts 317, 318, 319 will energize the motor 293 in the unclamping rotational direction; the nut 332 will be moved to the left, Figure 10, and when the member is unclamped it will open the switch 335 which is in the holding circuit of contactor 315 with contact 316, thus cutting this holding circuit and stopping the motor.

The control panel is now checked to ascertain whether all other movable members are suitably clamped. Thus, in the case contemplated, the operator will depress the button 94 to effect clamping of the table 9. Pressing of button 94 effects the clamping of the table which was previously unclamped and will cause contactor 700 to be energized through the closed contact 720. The energization of contactor 700 will then close the contacts 701, 702, 703, 704. The closing of contact 701 will maintain the holding circuit of contactor 700 after the push button 94 has been released. Upon closing of the contacts 702, 703, 704 the motor 294 will be energized for the reverse rotational direction to produce a movement towards the right in Figure 13 of nut 722. In this movement this motor will therefore cause the table 9 to be clamped and on reaching the end of its movement, the nut 722 will open the limit switch 720, thus deenergizing the contactor 700 and stopping the motor 294 while concomitantly closing the contact 721 which will switch on the pilot lamp 344 thereby indicating that the table 9 is suitably clamped.

The operation of selector 505 to point its arrow toward the direction selector 508 will connect the corresponding feed motor 117 for the headstock 8 to the terminals of the generator 120 upon closing contacts 137 when contactor 132 controlling the connection of motor 117 is energized. Contactor 132 is connected, on the one hand, to the R phase of the supply and, on the other hand, to the T phase thereof through the circuit comprising the respective wire 676, corresponding wire 677, contact stud 623, brush contact 620 of member selector 505, wire 679, closed contact 673 of the manual operation device, wire 681 and phase T.

The setting of the direction selector 508 pointing toward the right (Figure 8) brings the brush contacts 730 and 735 respectively into engagement with the contact studs 731 and 736. These brush contacts 730 and 735 in cooperation with the contact studs 731, 732 and 736, 737 control the circuits respectively to the forward-movement relay 160 and the reverse-movement relay 165. As will be understood from the description of the circuits to follow, these brush contacts 730 and 735 are connected in circuit with the brush contacts 625 and 630 of the member selector 505 for conditioning the circuit for movement of the selected member in the selected direction.

However, the motor cannot start yet because the generator 120 driven by the three phase motor 119 will rotate without load since its field winding 123 is not yet connected to the exciter 121, both relays 160 and 165 being still deenergized.

Let it be assumed that the values of the engagement and working speeds are respectively set to the values required and that it is desired to start a machining operation. To bring the workpiece near the tool at the fast speed, the lever 520 is brought into position in front of the notch "Q" (fast speed), raised and then released. By this single operation the fast speed has been selected and imparted to the selected movable member of the machine in the following manner:

When the lever 520 is brought in front of notch "Q" the contact 663 is closed by cam 660 which is operatively connected to the lever 520. When the lever 520 is raised in the upper notch Q, the double switch 549a—549b closes which produces simultaneous energization of forward relay 160 and fast-speed relay 803 through the following electrical circuits:

(a) As concerns relay 160: supply line T, contact 674, wire 821, contact 551, wire 822, contact 547, wire 823, contact 549a, contact 677, wire 697, brush 625, stud 628, wire 694, brush 730, contact stud 731, wire 682, relay coil 160, and supply line R. The relay 160 is thus energized and the field windings 123 of the generator 120 are energized, thus energizing the motor 117 to bring the workpiece near the tool. The energization of relay 160 causes the closing of its holding contact 161 and even though the lever 520 has been released with subsequent opening of contact 549a, relay 160 is maintained energized through the following circuit: supply line T, contact 674, wire 821, contact 551, wire 822, contact 547, wire 695, holding contact 161, relay coil 160, and supply line R;

(b) As concerns relay 803: supply line T, contact 674, wire 821, contact 551, wire 822, contact 547, wire 823, contact 549a, contact 549b, wire 824, contact 663, wire 825, relay coil 803, wire 826, contact 819 of relay 817, wire 827, supply line R. The energization of relay 803 causes the closing of its holding contact 809, and even though the lever 520 has been released with subsequent opening of contacts 549a and 549b, relay 803 is maintained energized through the following circuit: supply line T, contact 674, wire 821, contact 551, wire 822, contact 547, wire 695, wire 828, interlocking contact 814 of relay 802, interlocking contact 812 of relay 801, holding contact 809 of relay 803, relay coil 803, wire 826, contact 819 of relay 817, wire 827 and supply line R.

The energization of relay 803 causes the motor 117 to run at the fast speed due to the short-circuiting of the required portion of the rheostat 190 by the principal contact 806 of relay 803.

When the workpiece has been brought sufficiently close to the tool the value of the speed is to be reduced to the engagement speed. To effect this reduction the lever 520 is brought in position in front of the notch E (engagement speed), raised in the upper notch and then released. This further movement of the lever causes contact 663 to open and 661 to close. Since relay 160 is already energized, the closing of contact 549, when raising the lever, has no effect on this relay. However, the engagement speed relay 801 is energized through the following circuit; supply line T, contact 674, wire 821, contact 551, wire 822, contact 547, wire 823, contact 549a, contact 549b, wire 824, contact 661, wire 690, relay coil 801, contact 819 of relay 817, wire 827 and supply line R. The energization of relay coil 801 produces the closing of contact 804, short-circuiting in the rheostat 190 the portion corresponding to the engagement speed. The motor 117 thus runs at the engagement speed. It is to be noted that the energization of the engagement speed relay 801 produces also the closing of its holding contact 807 and the opening of its two interlocking contacts 811 and 812.

The energization of relay 801 is maintained in the same manner as the energization of the fast speed relay 803 by means of its holding contact through the following circuit: supply line T, contact 674, wire 821, contact 551, wire 822, contact 547, wire 695, wire 828, interlocking contact 813 of relay 802, interlocking contact 816 (which is closed as hereinafter explained) of relay 803, holding contact 807 of relay 801, relay coil 801, contact 819 of relay 817, wire 827 and supply line R.

The opening of interlocking contact 812 of the engagement speed relay 801 causes the holding circuit (as traced above) of the fast-speed relay 803 to be cut off, which produces the de-energization of this fast-speed relay 803 and consequently the closing of its interlocking contact 806 which permits the completion of the holding circuit of the engagement speed relay 801 now energized. The de-energization of the fast-speed relay 803 destroys, of course, the fast speed switching of the rheostat.

The tool has now entered the work piece and the feed may be increased to the working speed. To obtain this speed, the lever 520 is again moved and brought in front of notch W (working speed), raised in the upper notch and released.

The change from the engagement speed to the working speed is effected in a manner similar to the change from the fast speed to the engagement speed. The working speed relay 802 is energized and the engagement speed relay 801 is deenergized. The initiation of the energization of the working speed relay 802 takes place through the following circuit: supply line T, contact 674, wire 821, contact 551, wire 822, contact 547, wire 823, contact 549a, contact 549b, wire 824, contact 662, wire 831, relay coil 802, wire 826, contact 819 of relay 817, wire 827 and supply line R. The holding circuit of this working speed relay 802 is the following: supply line T, contact 674, wire 821, contact 551, wire 822, contact 547, wire 695, wire 828, interlocking contact 811 of relay 801, interlocking contact 815 of relay 803, holding contact 808 of working speed relay 802, relay coil 802, wire 826, contact 819 of relay 817, wire 827 and supply line R.

It is now supposed that the machining cut is finished and that the workpiece has to be returned quickly to its original position. For that purpose it is sufficient to move the lever 520 horizontally to the quick return position indicated by the reference letter R and to raise it in the corresponding upper notch. Starting from any of the engagement, working, or fast speed positions, the lever 520 opens the contact 551 when it is moved to the quick return position. Since this contact 551 is located in the holding circuit of the forward relay 160, as well as of the speed-selecting relays 801, 802 and 803, its opening causes the de-energization of any of these relays already energized.

This results, at the same time, in the stopping of the motor, since the generator field circuit is cut off, and in all the short-circuiting contacts of the rheostat to be opened, thus establishing the conditions for the minimum operating speed. When the lever 520 is in the quick return position, the cam 660 closes the contact 669 and since the latter is connected across contact 663 of the fast speed, the raising of lever 520 in notch R produces, as concerns the speed relays and their circuits, the same effect as the raising of the lever in the notch Q. However, when the lever 520 was brought to the quick return position the cam 665, operatively connected to this lever, caused the contact 677 to open and 668 to close. The result is that the raising of the lever 520 causes, this time, the energization of reverse relay 165 instead of the forward relay 160. The current in the field winding of the generator is then reversed, and the motor rotates at the fast speed in the opposite direction.

To stop the movement, it is sufficient to depress the lever into the lower notch. This movement de-energizes the reverse relay 165 by virtue of the opening of contact 547 which, as previously stated, is inserted in the holding circuit of this relay.

Finally, it is apparent that when the lever 520 is in position in front of notch Vm (minimum speed) the cam 660 is then situated on its right hand side position, looking at the sketch, in Figure 7, and consequently closes no contact. When the lever 520 is raised in this notch the motor will be operated at the minimum speed since none of the speed controlling relays is energized and no portion of the rheostat is then short-circuited.

It is to be noted that whatever may be the position of the lever 520, it is possible to stop the motor by merely depressing the lever into the corresponding lower notch since this movement causes the contact 547 to be opened by the member 555 which is operatively connected to the lever 520.

It is to be noted that during manual control operation of the device by means of control disk 570 relay 817 is energized and causes contact 819 to open, thus preventing the energization of any of the automatic speed control relays 801, 802 and 803, since the coils of these relays are all connected to the supply line R through the contact 819.

For moving any other movable member of the machine the member selector 505 is rotated so as to point toward the depicted member desired to be moved, that is, toward the direction selector associated with such member and this direction selector is set according to the desired direction of movement of the selected member. Before starting movement, however, the corresponding member should be unclamped for movement and the other members clamped by pressing the corresponding push buttons as already explained.

The adjustment of the "engagement" and "working" speeds as well as the starting take place exactly in the same way for the movement of any machine member.

This application is a continuation in part of the application Serial No. 19,454 filed April 7, 1948 which was itself a continuation in part of the application Serial No. 691,362 filed August 17, 1946, now abandoned, and Serial No. 780,670 filed October 18, 1947 also now abandoned.

What I claim is:

1. In a device for controlling the operation of a machine member adapted to be operated at different speeds, the combination with speed selecting means determining said different speeds respectively, a motor operatively connected to said machine member for driving said machine member at the selected speed, supply means adapted to energize said motor, a controlling relay adapted when energized to provide for energization of said motor and when de-energized to cut the supply to stop said motor, a holding circuit for said controlling relay, and holding contacts inserted in said holding circuit, of a handle supported to be movable to and fro in a predetermined path of movement successively to a plurality of selecting positions and movable in said positions transversely of said path, means confining said handle when in a selecting position and moved transversely of said path to prevent movement in a direction parallel to said path to another selecting position, a pre-selecting member operatively connected to said handle so as to be moved thereby when said handle is moved to and fro in said predetermined path of movement, a plurality of pre-selecting contacts selectively actuated by said pre-selecting member when said handle is set to said selecting positions respectively, said pre-selecting contacts being adapted to control said speed selecting means for determining a selected speed, a control member operatively connected to said handle so as to be moved thereby when said handle is moved transversely of said predetermined path of movement at any of said selecting positions, a starting contact adapted to be actuated by said control member when said handle is moved transversely of said path in one direction and adapted to energize said controlling relay, and a stopping contact inserted in said holding circuit and adapted to be actuated by said control member when said handle is moved transversely of said path in the opposite direction to de-energize said controlling relay.

2. In a device for controlling the operation of a machine member, the combination as defined in claim 1 in which said speed selecting means comprise a rheostat adapted to adjust the speed of said motor, said rheostat being provided with at least one slider and adapted to determine a plurality of resistances corresponding respectively to different speeds of said motor, and speed selecting relays adapted to select one of said resistances.

3. In a device for controlling the operation of a machine member adapted to be operated at different speeds, the combination with speed selecting means determining said different speeds respectively, a motor operable in either rotational direction for driving said machine member at the selected speed in one direction and in the other respectively, supply means adapted to energize said motor, two controlling relays adapted when energized to provide for energization of said motor for rotation in one direction and in the opposite direction respectively and when de-energized to cut the supply to said motor, holding circuits for said controlling relays, and holding contacts inserted in said holding circuits, of a handle supported to be movable to and fro in a predetermined path of movement successively to a plurality of selecting positions and movable in said positions transversely of said path, means confining said handle when in a selecting position and moved transversely of said path to prevent movement in a direction parallel to said path to another selecting position, a preselecting member operatively connected to said handle so as to be moved thereby when said handle is moved to and fro in said predetermined path of movement, a plurality of preselecting contacts selectively actuated by said pre-selecting member when said handle is set to said selecting positions respectively, said preselecting contacts being adapted to control said speed selecting means for determining a selected speed, a direction selecting member operatively connected to said handle so as to be moved thereby when said handle is moved to and fro in said predetermined path of movement, two direction selecting contacts adapted to be selectively actuated by said direction selecting member and adapted to be electrically connected to said controlling relays respectively, a control member operatively connected to said handle so as to be moved thereby when said handle is moved transversely of said predetermined path of movement at any of said selecting positions, a starting contact adapted to be actuated by said control member when said handle is moved transversely of said path in one direction and adapted to energize the one of said controlling relays which has been selected by the selective actuation of said direction-selecting contacts, and a stopping contact inserted in said holding circuits and adapted to be actuated by said control member when said handle is moved transversely of said path in the opposite direction to de-energize the selected controlling relay.

4. In a device for controlling the operation of a machine member adapted to be operated at different speeds, the combination with a Leonard group comprising a motor for driving said machine member at the selected speed, a generator provided with a field winding and adapted to energize said motor, and an exciter adapted to be connected to said field winding, a rheostat adapted to adjust the current in said field winding, a controlling relay adapted when energized to connect said exciter to said field winding, a holding circuit for said controlling relay, holding contacts inserted in said holding circuit, and speed selecting relays the contacts of which are adapted to short-circuit different portions of said rheostat, of a handle supported to be movable to and fro in a predetermined path of movement successively to a plurality of selecting positions and movable in said positions transversely of said path, means confining said handle when in a selecting position and moved transversely of said path to prevent movement in a direction parallel to said path to another selecting position, a pre-selecting member operatively connected to said handle so as to be moved thereby when said handle is moved to and fro in said predetermined path of movement, a plurality of pre-selecting contacts selectively actuated by said pre-selecting member when said handle is set to said selecting positions respectively, said preselecting contacts being adapted to control said speed selecting relays for determining a selected speed, a control member operatively connected to said handle so as to be moved thereby when said handle is moved transversely of said predetermined path of movement at any of said selecting positions, a starting contact adapted to be actuated by said control member when said handle is moved transversely of said path in one direction and adapted to energize said controlling relay, and a stopping contact inserted in said holding circuit and adapted to be actuated by said control member when said handle is moved transversely of said path in the opposite direction to de-energize said controlling relay.

5. In a device for controlling the operation of a machine member, the combination as defined in claim 3 in which a safety contact is provided in the holding circuits of said controlling relays for de-energizing both of said controlling relays when said handle is moved from a selecting position corresponding to the rotation of said motor in one direction to a selecting position corresponding to the rotation of said motor in the opposite direction.

6. In a device for controlling the operation of a machine member adapted to be operated under a plurality of running conditions, the combination with conditioning means comprising conditioning relays determining said running conditions, holding contacts for said conditioning relays, interlocking contacts for preventing simultaneous energization of several of said conditioning relays, holding and interlocking circuits comprising said holding contacts and said interlocking contacts, and driving means comprising a motor for driving said machine member at the selected running condition, of a handle supported to be movable to and fro in a predetermined path of movement successively to a plurality of selecting positions and movable in said positions transversely of said path, means confining said handle when in a selecting position and moved transversely of said path to prevent movement in a direction parallel to said path to another selecting position, a pre-selecting member operatively connected to said handle so as to be moved thereby when said handle is moved to and fro in said predetermined path of movement, a plurality of pre-selecting contacts selectively actuated by said pre-selecting member when said handle is set to said selecting positions respectively, said pre-selecting contacts being adapted to control said conditioning relays respectively for determining said running conditions, a control member operatively connected to said handle so as to be moved thereby when said handle is moved transversely of said predetermined path of movement at any of said selecting positions, a switch provided with a starting contact and a conditioning contact and adapted to be actuated by said control member when said handle is moved transversely of said path in one direction so as to close simultaneously said starting and conditioning contacts, said starting contact when actuated being adapted to make said driving means effective to drive said machine member and said conditioning contact being electrically connected to said preselecting contacts, and a stopping contact adapted to be actuated by said control member when said handle is moved transversely of said path in the opposite direction to make said driving means ineffective.

7. In a device for controlling the operation of a machine member, the combination as defined in claim 6 which comprises supply means adapted to energize said motor, and a controlling relay adapted to be energized when said starting contact is closed by the actuation of said control member for connecting said motor to said supply means.

8. In a device for controlling the operation of a machine member, the combination as defined in claim 6 in which said conditioning means comprises also a rheostat adapted to adjust the speed of said motor, said rheostat being provided with at least one slider and adapted to determine a plurality of resistances corresponding respectively to different speeds of said motor and said conditioning relays being adapted to select one of said resistances.

9. In a device for controlling the operation of a machine member adapted to be operated at different speeds, the combination with speed selecting relays determining said different speeds respectively, holding contacts for said speed-selecting relays, interlocking contacts for preventing simultaneous energization of several of said speed selecting relays, holding and interlocking circuits comprising said holding contacts and said interlocking contacts, a motor operable in either rotational direction for driving said machine member at the selected speed in one direction and in the other respectively, supply means adapted to energize said motor, and two controlling relays adapted when energized to provide for energization of said motor for rotation in one direction and in the opposite direction respectively and when de-energized to cut the supply to said motor, of a handle supported to be movable to and fro in a predetermined path of movement successively to a plurality of selecting positions and movable in said positions transversely of said path, means confining said handle when in a selecting position and moved transversely of said path to prevent movement in a direction parallel to said path to another selecting position, a pre-selecting member operatively connected to said handle so as to be driven thereby when said handle is moved to and fro in said predetermined path of movement, a plurality of pre-selecting contacts selectively actuated by said pre-selecting member when said handle is set to said selecting positions respectively, said pre-selecting contacts being adapted to control said speed selecting relays respectively for determining the selected speed, a direction selecting member operatively connected to said handle so as to be moved thereby when said handle is moved to and fro in said predetermined path of movement, two direction-selecting contacts adapted to be selectively actuated by said direction selecting member and adapted to be electrically connected to said controlling relays respectively, a control member operatively connected to said handle so as to be moved thereby when said handle is moved transversely of said predetermined path of movement at any of said selecting positions, a switch provided with a starting contact and a conditioning contact and adapted to be actuated by said control member when said handle is moved transversely of said path in one direction, so as to close simultaneously said starting and conditioning contacts, said starting contact being adapted to energize the one of said controlling relays which has been selected by the selective actuation of said direction selecting contacts and said conditioning contact being electrically connected to said pre-selecting contacts, and a stopping contact inserted in said holding and interlocking circuits and adapted to be actuated by said control member when said handle is moved transversely of said path in the opposite direction to de-energize the selected controlling relay and the selected speed selecting relay.

10. In a device for controlling the operation of a machine member adapted to be operated at different speeds, the combination with a Leonard group comprising a motor for driving said machine member at the selected speed, a generator provided with a field winding and adapted to energize said motor, and an exciter adapted to be connected to said field winding, a rheostat adapted to adjust the current in said field winding, a controlling relay adapted when energized to connect said exciter to said field winding, speed selecting relays the contacts of which are adapted to short-circuit various portions of said rheostat, holding contacts for said speed selecting relays, interlocking contacts for preventing simultaneous energization of several of said speed selecting relays, and holding and interlocking circuits comprising said holding contacts and said interlocking contacts, of a handle supported to be movable to and fro in a predetermined path of movement successively to a plurality of selecting positions and movable in said positions transversely of said path, means confining said handle when in a selecting position and moved transversely of said path to prevent movement in a direction parallel to said path to another selecting position, a pre-selecting member operatively connected to said handle so as to be moved thereby when said handle is moved to and fro in said predetermined path of movement, a plurality of pre-selecting contacts selectively actuated by said pre-selecting member when said handle is set to said selecting positions respectively, said pre-selecting contacts being adapted to control said speed selecting relays for determining a selected speed, a control member operatively connected to said handle so as to be moved thereby when said handle is moved transversely of said predetermined path of movement at any of said selecting positions, a switch provided with a starting contact and a conditioning contact and adapted to be actuated by said control member when said handle is moved transversely of said path in one direction so as to close simultaneously said starting and conditioning contacts, said starting contact being adapted to energize said controlling relay and said conditioning contact being electrically connected to said pre-selecting contacts, and a stopping contact inserted in said holding and interlocking circuits and adapted to be actuated by said control member when said handle is moved transversely of said path in the opposite direction to de-energize said controlling relay and the selected speed selecting relay.

11. In a device for controlling the operation of a machine member, the combination as defined in claim 9 in which a safety contact is provided in series with said stopping contact, said safety contact being actuated by said pre-selecting member when said handle is moved from a selecting position corresponding to the rotation of said motor in one direction to a selecting position corresponding to the rotation of said motor in the opposite direction.

12. In a device for controlling the operation of a machine adapted to be operated under a plurality of running conditions, in combination a lever supported on a shaft for movement of said lever to and fro substantially in a plane transversely of the axis of rotation of said shaft concomitantly with rotation of said shaft on its axis, said lever also being pivotally supported upon said shaft for movement thereof to and fro in directions transversely of said plane, a member provided with a slot located substantially in said plane for confining the movement of said lever substantially in said plane concomitantly with rotation of said shaft on said axis, said member being provided with a plurality of notches intersecting said slot at either side thereof and determining selective positions for movement of said lever transversely of said plane and preventing movement of said lever in a direction parallel to said plane when said lever is moved into the selected notch, a rotary switch operable to a plurality of positions corresponding to the respective conditions of operation of said machine for selecting a condition of operation, said switch being operatively connected to said shaft and provided with a plurality of contacts respectively actuated when said lever while rotating together with said shaft is in register with the respective notches, a pair of switches co-operating with said rotary switch respectively for initiating and for stopping the operation of the machine under a selected condition, and means operatively connecting said lever with said switches of said pair respectively to initiate operation of the machine under the selected condition upon movement of said lever into a selected notch on one side of said slot and to stop the operation of the machine upon movement of said lever into a selected notch on the other side of said slot.

13. In a device for controlling the operation of a machine adapted to be operated at a plurality of different speeds, in combination, speed selecting means connected to said machine and operable to a plurality of positions corresponding to different forward and reverse operating speeds of said machine for selecting an operating speed, control means cooperating with said speed selecting means for starting and stopping said machine, a handle supported to be movable to and fro in a predetermined path of movement successively to a plurality of speed selecting positions including a reverse selecting position corresponding respectively to the positions of said speed selecting means and movable in said positions of said handle transversely of said path, means confining said handle when in a selected position and moved transversely of said path to prevent movement in a direction parallel to said path to another selected position, means operatively connecting said handle and said speed selecting means for actuating said speed selecting means to said different speed selecting positions when said handle is moved to and fro in said predetermined path of movement, means operatively connecting said handle and said control means for actuating said control means to start said machine for operation at the selected speed when said handle is moved at the corresponding selecting position transversely of said path, and stop means adapted to be operated by said handle when said handle is moved along a part of said path disposed between a forward operating speed position and a reverse operating speed position for stopping the machine before any reversal, said means confining said handle actuating said handle in such movement along said part to operate said stop means.

14. In a device for controlling the operation of a machine adapted to be operated at a plurality of different speeds, in combination, speed selecting means operable to a plurality of positions corresponding to different forward and reverse operating speeds of said machine for selecting an operating speed, control means cooperating with said speed selecting means for starting and stopping said machine, a handle supported to be movable to and fro in a predetermined path of movement successively to a plurality of speed selecting positions corresponding respectively to said positions of said speed selecting means and movable in said positions of said handle transversely of said path, a member provided with a slot located substantially in said path for confining the movement of said handle in said predetermined path of movement, said slot having a number of start notches along one of its edges and the same number of stop notches along the other edge respectively in front of said start notches for preventing movement of said handle in a direction parallel to said path when said handle is moved into the selected notch, said slot having a part offset in the direction of said stop notches in a zone located between the selective positions corresponding respectively to the forward operating speeds and a selective position corresponding to a reverse operating speed, means operatively connecting said handle and said speed selecting means for actuating said speed selecting means when said handle is moved to and fro in said predetermined path of movement, and means operatively connecting said handle and said control means for actuating said control means when said handle is moved transversely of said path at the respective forward speed selecting positions and for actuating said control means to stop the machine when said handle engages the offset part of said slot.

15. In a device for controlling the operation of a machine member, the combination as defined in claim 1 in which biasing means are provided to bias said handle towards said predetermined path of movement.

16. In apparatus for controlling the operation of a machine member at different speeds, the combination with a source of electrical supply, a motor energizable from said supply when connected thereto and capable of operating at different speeds and operatively connected to said machine member for driving said machine member at the different speeds, and speed determining means electrically connected to said motor and operable to determine the different speeds of said motor, of a speed selecting member supported to be movable to and fro in a predetermined path of movement successively to a plurality of speed selecting positions and movable in the respective positions transversely of said path at either side thereof, a plurality of speed selecting contacts disposed along said path and actuated by said speed selecting member in the respective speed selecting positions thereof and electrically connected to said speed determining means to determine the different speeds of the motor in said respective speed selecting positions of said member, and a starting contact and a stopping contact adapted to be actuated respectively when said speed selecting member in any selecting position thereof is moved transversely of said path in a given direction and in the opposite direction, said starting and stopping contacts being electrically connected to said speed selecting contacts and to said motor respectively to start and stop said motor upon actuation of said contacts by said transverse movements of said selecting member.

References Cited in the file of this patent

UNITED STATES PATENTS

| Number | Name | Date |
| --- | --- | --- |
| 1,053,499 | Hall | Feb. 18, 1913 |
| 1,119,384 | Zimmer | Dec. 1, 1914 |
| 1,173,334 | Amberton | Feb. 29, 1916 |
| 1,450,572 | Bahls | Apr. 3, 1923 |